No. 692,943. Patented Feb. 11, 1902.
C. S. THOMPSON.
BICYCLE GEARING.
(Application filed June 28, 1901.)
(No Model.)
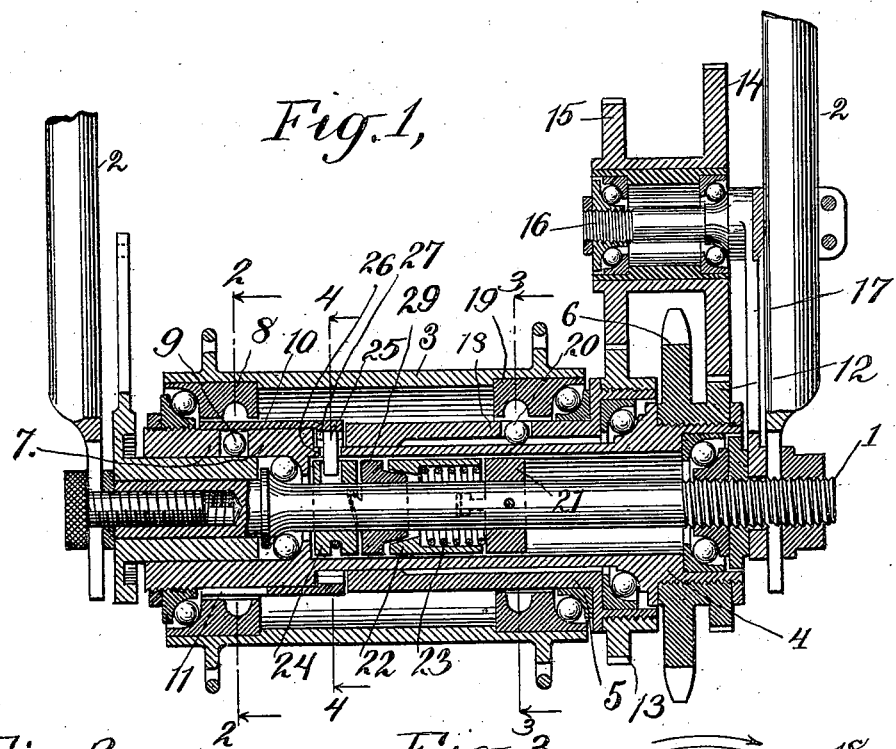
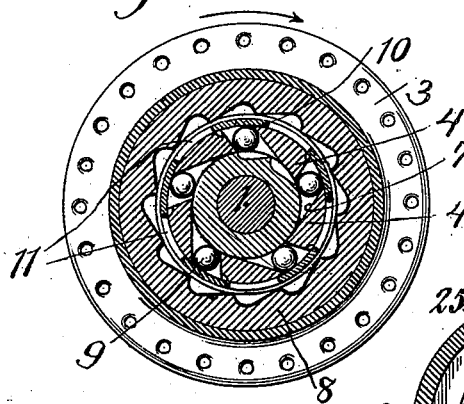
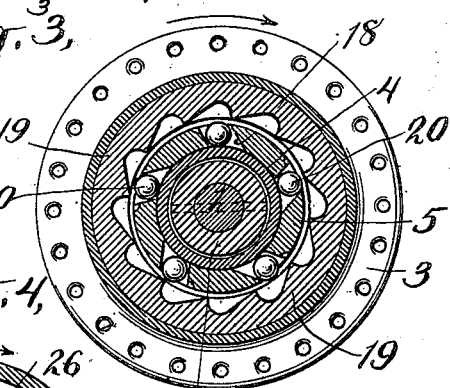
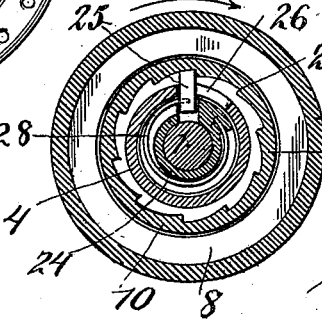
WITNESSES:
Harry Goss.
C. F. Carrington.
INVENTOR
Chas. S. Thompson
BY
Chapin & Hayward
his ATTORNEYS
THE NORRIS PETERS CO., PHOTO-LITHO., WASHINGTON, D. C.

UNITED STATES PATENT OFFICE.

CHARLES S. THOMPSON, OF ELIZABETH, NEW JERSEY.

BICYCLE-GEARING.

SPECIFICATION forming part of Letters Patent No. 692,943, dated February 11, 1902.

Application filed June 28, 1901. Serial No. 66,359. (No model.)

*To all whom it may concern:*

Be it known that I, CHARLES S. THOMPSON, a citizen of the United States of America, and a resident of Elizabeth, in the county of Union and State of New Jersey, have invented certain new and useful Improvements in Bicycle-Gearing, of which the following is a specification, reference being had to the accompanying drawings, forming a part thereof.

My invention consists in the provision of a change speed-gearing mechanism for bicycles in which the operation of changing from one speed to another is effected through the driving mechanism itself.

My invention comprises a high-speed or primary driving member and an intermediate driving member driven by the primary member, but at a lower relative speed, and means for connecting either the primary or the intermediate member directly to the wheel to be driven, such means being controlled by movements of the driving mechanism.

My invention further consists in the provision, in addition to the foregoing, of means whereby the wheel may be permitted to run free of the driving mechanism when desired.

The objects of my invention are to provide a two-speed gearing for a bicycle and means whereby the wheel may be permitted to run free, the changes from one speed to another or from connection to disconnection, so that the wheel may be free, being effected by a movement of the driving mechanism itself through the pedals and without the addition of any hand-operated means.

My invention is particularly applicable to chain-driven machines, and in the embodiment of my invention illustrated and described herewith I have shown it in such connection.

My invention also consists in certain details of construction and combination of parts to be hereinafter more fully described, and other advantages will appear hereinafter.

I will now proceed to describe bicycle-gearing embodying my invention and will then point out the novel features in claims.

In the drawings, Figure 1 is a view in central longitudinal section of a bicycle-gearing embodying my invention; and Figs. 2, 3, and 4 are views in transverse section of the same, taken, respectively, on the plane of the lines 2 2, 3 3, and 4 4 of Fig. 1.

In the embodiment of my invention herein illustrated the stationary rear axle of a bicycle-wheel is shown at 1, the said axle secured to the rear stays 2 2 of the bicycle-frame in a manner well known. The rear or driving wheel is represented by its hub 3, and the said hub is mounted to rotate upon suitable ball-bearings with respect to the stationary axle 1 and intermediate parts. Interposed between the hub 3 are two driving-sleeves, one of which, for purposes of this specification I term the "high-speed sleeve" or "primary driving member" and to which is secured the small driving-sprocket 6, forming a transmitting member, and the other of which I term the "low-speed sleeve" or "intermediate driving member." The high-speed sleeve I have designated by the reference character 4 and the low-speed sleeve by the reference character 5. Suitable ball-bearings are shown as disposed between the said sleeves, the hub, and the axle; but such bearings require no detailed description herein, as being of a character well known in the art to which this invention appertains. The high-speed sleeve 4 carries near one of its ends one member 7 of a ball-clutch, the other member 8 of which is carried by the hub 3. Suitable clutch-balls 9 are disposed between the two members. The relative arrangement of these parts will be readily understood by reference to Fig. 2 of the drawings.

The action thereof is as follows: When the high-speed sleeve 4 and with it the inner member 7 of the clutch is revolved in the direction of the arrow of Fig. 2, the balls will have a tendency to enter the recesses formed in the inner face of the outer clutch member 8, carried by the hub. If they are permitted to enter the said recesses or if any one ball is permitted to enter one of the said recesses, they or it will become jammed between the said recesses or a recess and shoulders or a shoulder formed at the edge of the pockets or pocket in the said inner clutch member 7, carrying the balls, and the high-speed sleeve 4 and the hub 3 will be locked together in such a way as to cause the hub to be driven in the direction of the arrow of Fig. 1 by the said sleeve. Should the speed of the hub, however, have a tendency to become greater than that of the said sleeve 4, the said clutch-balls 9 will retire into the pockets in the inner clutch member and the hub (and consequently the wheel of which it forms a part) will be permitted to run free. Thus the high-speed sleeve may, if desired, be held stationary, while the wheel is permitted to run free, and a suitable brake may be employed in order to retain control of the wheel. Such brake may conveniently be of the form shown in the patent to Copeland, No. 643,085, and dated February 6, 1900, and I have shown herein a brake-acting member 30 in accordance with the structure of such patent as showing the same as adapted for use in connection with the present invention. Further or detailed description of the same is, however, unnecessary, for the reason that such brake forms no part of the present invention and for the reason, also, that any form of brake may be employed as may be desired.

I have provided a ball-retaining sleeve 10, which is carried by the high-speed sleeve and is in intimate frictional contact therewith. The said ball-retaining sleeve 10 surrounds the high-speed sleeve, and a portion thereof is interposed between the two said clutch members 7 and 8. There are five clutch-balls 9 shown as provided in the said clutch, and there are an equal number of openings 11 in that portion of the ball-retaining sleeve 10 which is interposed between the said clutch members. In certain positions of the said ball-retaining sleeve 10 relatively to the high-speed sleeve 4, upon which it is mounted, these openings register with the pockets carrying the clutch-balls 9, and the balls are permitted to pass freely therethrough. In such positions the said clutch will operate as before mentioned. In intermediate positions of the ball-retaining sleeve relatively to the high-speed sleeve the said clutch-balls 9 will be retained by the said sleeve within the pockets of the inner member 7 of the clutch and the said clutch will not be permitted to operate.

While the ball-retaining sleeve 10 is, as hereinbefore stated, in intimate frictional contact with the said high-speed sleeve, it is permitted and caused to have a step-by-step rotary movement thereon under the influence of certain actuating mechanism controlled and operated by certain movements of the high-speed sleeve itself. This will appear more fully hereinafter.

The low-speed sleeve or intermediate driving member 5 derives its motion through intermediate gearing between it and the high-speed sleeve or primary driving member 4.

The high-speed sleeve 4 carries a gear-wheel 12 and the low-speed sleeve 5 carries a gear-wheel 13. The said gear-wheels mesh, respectively, with intermediate gear-wheels 14 and 15, suitably secured to rotate together and mounted upon a stud 16. The ratio of gearing is such as to transmit from the high-speed sleeve or primary driving member 4 to the low-speed sleeve or intermediate driving member 5 a relatively slow movement in the same direction.

The stud 16 is secured to a stationary portion of the bicycle-frame and may conveniently be bolted upon one of the rear stays 2. It is so shown in the drawings herewith, and, further, is provided with an extension 17, which embraces the stationary axle 1. By this provision the said intermediate gears will be adjusted whenever the said axle 1 is adjusted and the proper relationship between the said intermediate gears and the gear-wheels 14 and 15 will be maintained.

The low-speed sleeve 5 is provided with or has arranged as a part of it the inner member 18 of a clutch, and the hub 3 is provided with the outer member 19 thereof. Clutch-balls 20 are arranged within pockets in the inner member and are adapted to engage recesses in the outer member.

The clutch 18 19 20 is similar in construction and operation to the clutch 7 8 9 and further detailed description thereof is hence unnecessary. The sectional view Fig. 3 illustrates clearly the relationship of parts.

When the clutch 7 8 9 is in operative connection, the hub, as before stated, is driven by the high-speed sleeve or primary driving member 4. The low-speed sleeve or intermediate driving member 5 is also driven thereby through the intermediate gearing provided; but the speed thereof being slower than that of the hub the clutch-balls 20 of the clutch 18 19 20 will retire into the pockets of the inner clutch member 18, and there will be no operative connection through the said last-named clutch. The intermediate gearing and the low-speed sleeve will at such times run free. For the same reason this form of clutch will permit the hub to run freely, while the driving members are held stationary in the same manner as will the clutch 7 8 9, as previously pointed out. When, however, the ball-retaining sleeve 10 is in such position as to hold the clutch 7 8 9 out of operative engagement in the manner previously described, the clutch 18 19 20 will be permitted to operate, and the hub will be driven by the primary driving member through the intermediate member, and hence at a relatively lower rate of speed than if driven directly by the primary driving member through the clutch 7 8 9.

The position of the ball-retaining sleeve may be regulated at will by movements of the driving mechanism transmitted through the power-transmitting member. For this purpose there is provided a stationary abutment which is rigidly secured upon the axle 1 and the relatively stationary member 22 of a small friction or cone clutch, which is also mounted upon the said axle, but permitted to have a slight longitudinal movement thereon. A spring 23 tends to force the said relatively stationary member away from the stationary abutment, while a limited stop prevents an excess of such movement. A relatively rotatable clutch member 24 is loosely mounted upon the said axle, and a dog or pawl 25, carried by the said rotatable clutch member, engages the high-speed sleeve and forms a connection therewith by which the said rotatable clutch member may be operated. The said dog passes through a slot 26 (see more particularly Fig. 4) in the high-speed sleeve, and when running normally the said rotatable clutch member 24 is caused to partake of the movement of the said high-speed sleeve by reason of the said dog bearing against the shoulder at the rear end of the said slot.

The ball-retaining sleeve 10 is provided at its inner end with ten internal ratchet-teeth 27, there being one tooth for every position it is desired that the said sleeve shall assume. As before stated, the said sleeve has five openings 11, through which the five high-speed clutch-balls 9 are permitted when in register therewith to pass. A rotary movement of the said sleeve upon the said high-speed sleeve 4 of one-tenth of a revolution will alternately bring the said openings or the portions of the sleeve between them in register with the openings carrying the said balls. The dog or pawl 25 not only passes through the slot 26, as before stated, but further engages one of the teeth 27 of the ball-retaining sleeve 10. A leaf-spring 28 presses the pawl outwardly for this purpose.

An intermediate or loose clutch member 29 is loosely mounted upon the stationary axle 1 and is located between the relatively rotatable and stationary clutch members 22 and 24. The said intermediate clutch member has upon one side a cone-surface, which is normally just out of contact with the corresponding cone-surface upon the stationary clutch member 22, and upon the other side an inclined surface corresponding with a similar inclined surface on the said rotatable clutch member 24. The inclined surfaces upon both parts terminate with undercut shoulders, as shown, and these shoulders are adapted to engage under normal running condition of the parts. Under such normal running conditions the tendency of the rotatable member 24 of the clutch will be to hold the intermediate and loose clutch member 29 with its cone-surface away from the corresponding cone-surface of the stationary clutch member 22 and in its rotation will compel the rotation of the intermediate loose clutch member therewith. Should the driving means be stopped, the parts carried thereby and connected therewith will be held substantially stationary, but the wheel will run free. Should, however, the primary driving member or high-speed sleeve 4 be given a slight movement backward, as by back-pedaling upon the pedals connected therewith through sprocket-wheel and chain (not shown) and through the small sprocket-wheel or power-transmitting member 6, the high-speed sleeve 4 will be rotated backwardly. Upon the first backward movement of the said high-speed sleeve the relatively rotatable portion 24 of the cone-clutch will, by reason of the inclined surfaces between it and the intermediate or loose clutch member 29, force the same slightly outwardly, and the parts 24 and 29 will become locked to the stationary clutch member 22. The member 24 will hence not be permitted to move backwardly, and as the said member carries the dog or pawl 25 and the said dog or pawl is in engagement with one of the internal teeth 27 of the ball-retaining sleeve 10 the said ball-retaining sleeve will also be held stationary. The effect will be then to move the high-speed sleeve backward relatively to the ball-retaining sleeve, and the extent of such movement will be equal to substantially one-tenth of a revolution. The extent of such movement is regulated by the length of the slot 26, the high-speed sleeve being moved until the front end of the said slot comes into contact with the side of the dog or pawl 25 and being stopped thereby by reason of the fact that the said dog or pawl is at such times held rotatively stationary. A movement of one-tenth of a revolution will be sufficient to change the relative position of the ball-retaining sleeve 10, so as to change the same from a position of retaining the clutch-balls 9 from operating to a position to permit them to operate, or vice versa. Upon a forward movement of the driving mechanism, and hence of the high-speed sleeve 4, the said high-speed clutch will by reason of the before-mentioned intimate frictional connection between it and the ball-retaining sleeve carry the said ball-retaining sleeve with it. The cone-clutch members will during the first forward movement of the high-speed sleeve and the ball-retaining sleeve remain stationary, for the reason that they are still jammed or locked together and there has been so far no force applied to loosen them. During this movement, then, the dog or pawl 25 will be depressed by the inclined face of the tooth 27 with which it is in engagement until finally it is permitted to snap into position behind the next succeeding tooth 27. The said dog or pawl will during this time have been traversing the slot 26, and the rear end of which slot will at about this time have arrived at a point where it will engage the said dog or pawl. The forward impulse given to the dog or pawl and the cone-clutch member 24, which carries it, will release the said cone-clutch member, and the said cone-clutch member, high-speed sleeve, and ball-retaining sleeve will all rotate together, as heretofore. It will thus be seen that an intermittent step-by-step movement may be given to the ball-retaining sleeve at each rearward-and-forward movement of the driving mechanism and that therefore the clutch 7 8 9 will be alternately thrown out of operation or permitted to operate. The effect of this will be to control the relative speed at which the wheel is driven through the power-transmitting member of the driving mechanism itself and without the use or aid of any manually-operated device or attachment.

My invention is particularly adapted to use with chain-wheels, and the provision of two driving-sleeves geared together to rotate at different relative rates of speed, one of said sleeves provided with a sprocket-wheel and each of said sleeves adapted alternately to be operatively connected with the wheel to be driven, forms a very effective and simple speed-changing gear which may be operated through and by the driving mechanism itself.

I have shown a simple form of gear connection between the two driving-sleeves in the gear-wheels 12, 13, 14, and 15. It will of course be understood that I do not wish to be limited to this precise form of gear connection, as there are obviously many possible modifications of the same. Neither do I wish to be limited to the precise form or construction of the other parts of the device herein set forth, the same being but one embodiment of my invention.

What I claim is—

1. In bicycle-gearing, the combination with a primary driving member, a sprocket-wheel mounted thereon, an intermediate member and gearing connecting the said members whereby they are driven together, but at different relative rates of speed, of a wheel with which either the said primary or said intermediate member is adapted to engage, and means operated by the driving mechanism for permitting the engagement of either the primary member or the intermediate member with the wheel.

2. In bicycle-gearing, the combination with two driving members, of a sprocket-wheel forming a power-transmitting member for the said members, gearing connecting the said members whereby they are driven together, but at different relative rates of speed, means for operatively connecting either one or the other of said driving members with the wheel to be driven, and means operated by movements of the power-transmitting member for causing either one or the other of the said connecting means to operate.

3. In bicycle-gearing, the combination with two driving members, of a sprocket-wheel, forming a power-transmitting member, secured to one of the said members, gearing connecting the said members whereby they are driven together, but at different relative rates of speed, means for operatively connecting either one or the other of said driving members with the wheel to be driven, and means operated by movements of the power-transmitting member for causing either one or the other of the said connecting means to operate.

4. In bicycle-gearing, the combination with two driving members, of a sprocket-wheel forming a power-transmitting member for the said members, spur-gears connecting the said members whereby they are driven together, but at different relative rates of speed, means for operatively connecting either one or the other of said driving members with the wheel to be driven, and means operated by movements of the power-transmitting member for causing either one or the other of the said connecting means to operate.

5. In bicycle-gearing, the combination with two driving members, of a sprocket-wheel forming a power-transmitting member for the said members, a spur-gear carried by each said member, said spur-gears being of different diameters, two intermediate spur-gears secured together and engaging the first two said spur-gears, a journal or bearing for the said intermediate spur-gears, a stationary axle about which the said driving members are mounted to revolve, means for operatively connecting either one or the other of said driving members with the wheel to be driven, and means operated by movements of the power-transmitting member for causing either one or the other of the said connecting means to operate.

6. In bicycle-gearing, the combination with two driving members, of a sprocket-wheel forming a power-transmitting member for the said members, a spur-gear carried by each said member, said spur-gears being of different diameters, two intermediate spur-gears being together and engaging the first two said spur-gears, a journal or bearing for the said intermediate spur-gears, a stationary axle about which the said driving members are mounted to revolve, a link or bar connecting the said journal or bearing and the said stationary axle, means for operatively connecting either one or the other of said driving members with the wheel to be driven, and means operated by movements of the power-transmitting member for causing either one or the other of the said connecting means to operate.

CHARLES S. THOMPSON.

Witnesses:
D. HOWARD HAYWOOD,
M. M. CONOVER.